US008027642B2

(12) United States Patent
Proctor, Jr. et al.

(10) Patent No.: US 8,027,642 B2
(45) Date of Patent: Sep. 27, 2011

(54) TRANSMISSION CANCELLER FOR WIRELESS LOCAL AREA NETWORK

(75) Inventors: James A. Proctor, Jr., Melbourne Beach, FL (US); Kenneth M. Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1373 days.

(21) Appl. No.: 10/551,895

(22) PCT Filed: Apr. 6, 2004

(86) PCT No.: PCT/US2004/007708
§ 371 (c)(1),
(2), (4) Date: Oct. 4, 2005

(87) PCT Pub. No.: WO2004/095763
PCT Pub. Date: Nov. 4, 2004

(65) Prior Publication Data
US 2006/0240769 A1    Oct. 26, 2006

(51) Int. Cl.
*H04B 1/00* (2006.01)
*H04B 15/00* (2006.01)
(52) U.S. Cl. .............. 455/63.1; 455/13.1; 455/67.13; 455/11.1; 455/503; 455/501; 370/279; 370/315; 375/211; 375/214
(58) Field of Classification Search ............ 455/63.1, 455/11.1, 13.1, 67.13, 503, 501; 370/315, 370/279; 375/214, 211
See application file for complete search history.

(56) References Cited

U.S. PATENT DOCUMENTS

| | | |
|---|---|---|
| 3,363,250 A | 1/1968 | Jacobson |
| 4,000,467 A | 12/1976 | Lentz et al. |
| 4,001,691 A | 1/1977 | Gruenberg et al. |
| 4,061,970 A | 12/1977 | Magneron et al. |
| 4,081,752 A | 3/1978 | Sumi et al. |
| 4,124,825 A | 11/1978 | Webb et al. |
| 4,204,016 A | 5/1980 | Chavannes et al. |
| 4,334,323 A | 6/1982 | Moore et al. |
| 4,368,541 A | 1/1983 | Evans et al. |
| 4,509,206 A | 4/1985 | Carpe et al. |

(Continued)

FOREIGN PATENT DOCUMENTS
CN    1186401    7/1998
(Continued)

OTHER PUBLICATIONS

S. Kannangara and M. Faulkner, Analysis of an Adaptive Wideband Duplexer With Double-Loop Cancellation, IEEE Transactions on Vehicular Technology, vol. 56, No. 4, Jul. 2007.

(Continued)

*Primary Examiner* — Marceau Milord
(74) *Attorney, Agent, or Firm* — Linda G. Gunderson

(57) ABSTRACT

A frequency translating repeater (200) for use in a wireless local area network includes a cancellation unit. Canceller (402) is controlled by control (401) to provide an injection signal for canceling leakage in a receive signal path. Reference coupler (403) provides a reference signal from the transmit signal, injection coupler (404) injects a correction signal, and sample coupler (405) provides a sample for feedback. A processor (510) receives the sample signal through a detector (415). Although the present invention is intended for a frequency translating repeater, it has broad applications in radio transceivers in general. One specific application is with frequency division duplex (FDD) handsets or base stations utilizing CDMA technologies such as W-CDMA and IS-2000 or 1XEV-DV/DO.

42 Claims, 7 Drawing Sheets

U.S. PATENT DOCUMENTS

| | | | |
|---|---|---|---|
| 4,701,935 A | 10/1987 | Namiki et al. | |
| 4,723,302 A | 2/1988 | Fulmer et al. | |
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie et al. | |
| 5,095,528 A | 3/1992 | Leslie et al. | |
| 5,214,788 A | 5/1993 | Delaperriere et al. | |
| 5,220,562 A | 6/1993 | Takada et al. | |
| 5,280,480 A | 1/1994 | Pitt et al. | |
| 5,333,175 A | 7/1994 | Ariyavisitakul et al. | |
| 5,341,364 A | 8/1994 | Marra et al. | |
| 5,349,463 A | 9/1994 | Hirohashi et al. | |
| 5,368,897 A | 11/1994 | Kurihara et al. | |
| 5,371,734 A | 12/1994 | Fischer et al. | |
| 5,373,503 A | 12/1994 | Chen | |
| 5,383,144 A | 1/1995 | Kato | |
| 5,408,197 A | 4/1995 | Miyake et al. | |
| 5,408,618 A | 4/1995 | Aho et al. | |
| 5,430,726 A | 7/1995 | Moorwood et al. | |
| 5,446,770 A | 8/1995 | Urabe et al. | |
| 5,465,251 A | 11/1995 | Judd et al. | |
| 5,471,642 A | 11/1995 | Palmer et al. | |
| 5,485,486 A | 1/1996 | Gilhousen et al. | |
| 5,509,028 A | 4/1996 | Marque-Pucheu et al. | |
| 5,515,376 A | 5/1996 | Murthy et al. | |
| 5,519,619 A | 5/1996 | Seda | |
| 5,608,755 A | 3/1997 | Rakib et al. | |
| 5,610,916 A | 3/1997 | Kostreski et al. | |
| 5,648,984 A * | 7/1997 | Kroninger et al. | 375/211 |
| 5,654,979 A | 8/1997 | Levin et al. | |
| 5,659,879 A | 8/1997 | Dupuy et al. | |
| 5,678,177 A | 10/1997 | Beasley | |
| 5,678,198 A | 10/1997 | Lemson et al. | |
| 5,684,801 A | 11/1997 | Amitay et al. | |
| 5,697,052 A | 12/1997 | Treatch et al. | |
| 5,726,980 A | 3/1998 | Rickard et al. | |
| 5,732,334 A | 3/1998 | Miyake et al. | |
| 5,745,846 A | 4/1998 | Myer et al. | |
| 5,754,540 A | 5/1998 | Liu et al. | |
| 5,764,636 A | 6/1998 | Edsall et al. | |
| 5,767,788 A | 6/1998 | Ness | |
| 5,771,174 A | 6/1998 | Spinner et al. | |
| 5,784,683 A | 7/1998 | Sistanizadeh et al. | |
| 5,794,145 A | 8/1998 | Milam et al. | |
| 5,812,933 A | 9/1998 | Niki | |
| 5,815,795 A | 9/1998 | Iwai et al. | |
| 5,825,809 A | 10/1998 | Sim | |
| 5,852,629 A | 12/1998 | Iwamatsu et al. | |
| 5,857,144 A * | 1/1999 | Mangum et al. | 455/11.1 |
| 5,862,207 A | 1/1999 | Aoshima | |
| 5,875,179 A | 2/1999 | Tikalsky et al. | |
| 5,883,884 A | 3/1999 | Atkinson | |
| 5,884,181 A * | 3/1999 | Arnold et al. | 455/450 |
| 5,890,055 A * | 3/1999 | Chu et al. | 455/16 |
| 5,903,553 A | 5/1999 | Sakamoto et al. | |
| 5,907,794 A | 5/1999 | Lehmusto et al. | |
| 5,963,846 A * | 10/1999 | Kurby | 455/12.1 |
| 5,963,847 A | 10/1999 | Ito et al. | |
| 5,987,304 A | 11/1999 | Latt et al. | |
| 6,005,855 A | 12/1999 | Zehavi et al. | |
| 6,005,884 A | 12/1999 | Cook et al. | |
| 6,014,380 A | 1/2000 | Hendel et al. | |
| 6,032,194 A | 2/2000 | Gai et al. | |
| 6,061,548 A | 5/2000 | Reudink et al. | |
| 6,088,570 A | 7/2000 | Komara et al. | |
| 6,101,400 A | 8/2000 | Ogaz et al. | |
| 6,108,364 A | 8/2000 | Weaver, Jr. et al. | |
| 6,128,512 A | 10/2000 | Trompower et al. | |
| 6,128,729 A | 10/2000 | Kimball et al. | |
| 6,163,276 A | 12/2000 | Irving et al. | |
| 6,188,694 B1 | 2/2001 | Fine et al. | |
| 6,188,719 B1 | 2/2001 | Collomby et al. | |
| 6,195,051 B1 | 2/2001 | McCoy et al. | |
| 6,202,114 B1 | 3/2001 | Dutt et al. | |
| 6,215,982 B1 | 4/2001 | Trompower et al. | |
| 6,219,739 B1 | 4/2001 | Dutt et al. | |
| 6,222,503 B1 | 4/2001 | Gietema et al. | |
| 6,272,351 B1 | 8/2001 | Langston et al. | |
| 6,285,863 B1 | 9/2001 | Zhang et al. | |
| 6,298,061 B1 | 10/2001 | Chin et al. | |
| 6,304,563 B1 * | 10/2001 | Blessent et al. | 370/335 |
| 6,304,575 B1 | 10/2001 | Carroll et al. | |
| 6,331,792 B1 * | 12/2001 | Tonietto | 327/48 |
| 6,339,694 B1 | 1/2002 | Komara et al. | |
| 6,342,777 B1 | 1/2002 | Takahashi et al. | |
| 6,363,068 B1 | 3/2002 | Kinoshita et al. | |
| 6,370,185 B1 | 4/2002 | Schmutz et al. | |
| 6,370,369 B1 | 4/2002 | Kraiem et al. | |
| 6,377,612 B1 | 4/2002 | Baker et al. | |
| 6,377,640 B2 | 4/2002 | Trans | |
| 6,384,765 B1 | 5/2002 | Sjostrand | |
| 6,385,181 B1 | 5/2002 | Tsutsui et al. | |
| 6,388,995 B1 | 5/2002 | Gai et al. | |
| 6,393,299 B1 | 5/2002 | Mizumoto et al. | |
| 6,404,775 B1 | 6/2002 | Leslie et al. | |
| 6,441,781 B1 | 8/2002 | Rog et al. | |
| 6,473,131 B1 * | 10/2002 | Neugebauer et al. | 348/572 |
| 6,480,481 B1 | 11/2002 | Park et al. | |
| 6,501,955 B1 | 12/2002 | Durrant et al. | |
| 6,535,732 B1 | 3/2003 | McIntosh et al. | |
| 6,539,028 B1 | 3/2003 | Soh et al. | |
| 6,539,204 B1 * | 3/2003 | Marsh et al. | 455/63.1 |
| 6,549,542 B1 | 4/2003 | Dong et al. | |
| 6,549,567 B1 | 4/2003 | Fullerton et al. | |
| 6,563,468 B2 | 5/2003 | Hill et al. | |
| 6,574,198 B1 | 6/2003 | Petersson et al. | |
| 6,628,624 B1 | 9/2003 | Mahajan et al. | |
| 6,664,932 B2 | 12/2003 | Sabet et al. | |
| 6,671,502 B1 | 12/2003 | Ogawa et al. | |
| 6,684,058 B1 | 1/2004 | Karacaoglu et al. | |
| 6,690,657 B1 | 2/2004 | Lau et al. | |
| 6,694,125 B2 | 2/2004 | White et al. | |
| 6,718,160 B2 | 4/2004 | Schmutz et al. | |
| 6,728,541 B2 | 4/2004 | Ohkura et al. | |
| 6,766,113 B1 | 7/2004 | Al-Salameh et al. | |
| 6,781,544 B2 | 8/2004 | Saliga et al. | |
| 6,788,256 B2 | 9/2004 | Hollister | |
| 6,880,103 B2 | 4/2005 | Kim et al. | |
| 6,888,881 B1 | 5/2005 | Nagano | |
| 6,904,266 B1 | 6/2005 | Jin et al. | |
| 6,906,669 B2 | 6/2005 | Sabet et al. | |
| 6,934,511 B1 * | 8/2005 | Lovinggood et al. | 455/11.1 |
| 6,934,555 B2 | 8/2005 | Silva et al. | |
| 6,944,139 B1 | 9/2005 | Campanella et al. | |
| 6,957,042 B2 | 10/2005 | Williams et al. | |
| 6,983,162 B2 | 1/2006 | Garani et al. | |
| 6,985,516 B1 | 1/2006 | Easton et al. | |
| 6,990,313 B1 | 1/2006 | Yarkosky et al. | |
| 7,027,418 B2 | 4/2006 | Gan et al. | |
| 7,027,770 B2 | 4/2006 | Judd et al. | |
| 7,043,203 B2 | 5/2006 | Miquel et al. | |
| 7,050,442 B1 | 5/2006 | Proctor et al. | |
| 7,050,452 B2 | 5/2006 | Sugar et al. | |
| 7,058,071 B1 | 6/2006 | Myles et al. | |
| 7,058,368 B2 * | 6/2006 | Nicholls et al. | 455/114.2 |
| 7,088,734 B2 | 8/2006 | Newberg et al. | |
| 7,103,344 B2 * | 9/2006 | Menard | 455/343.2 |
| 7,120,930 B2 | 10/2006 | Maufer et al. | |
| 7,123,670 B2 | 10/2006 | Gilbert et al. | |
| 7,123,676 B2 * | 10/2006 | Gebara et al. | 375/364 |
| 7,132,988 B2 | 11/2006 | Yegin et al. | |
| 7,133,391 B2 | 11/2006 | Belcea et al. | |
| 7,133,460 B2 | 11/2006 | Bae et al. | |
| 7,139,527 B2 | 11/2006 | Tamaki et al. | |
| 7,167,526 B2 | 1/2007 | Liang et al. | |
| 7,187,904 B2 | 3/2007 | Gainey et al. | |
| 7,193,975 B2 | 3/2007 | Tsutsumi et al. | |
| 7,194,275 B2 * | 3/2007 | Bolin et al. | 455/456.6 |
| 7,200,134 B2 * | 4/2007 | Proctor et al. | 370/343 |
| 7,215,964 B2 | 5/2007 | Miyake et al. | |
| 7,230,935 B2 | 6/2007 | Proctor, Jr. et al. | |
| 7,233,771 B2 | 6/2007 | Proctor, Jr. et al. | |
| 7,248,645 B2 | 7/2007 | Vialle et al. | |
| 7,254,132 B2 | 8/2007 | Takao et al. | |
| 7,299,005 B1 * | 11/2007 | Yarkosky et al. | 455/7 |

| | | |
|---|---|---|
| 7,315,573 B2 | 1/2008 | Lusky et al. |
| 7,319,714 B2 | 1/2008 | Sakata et al. |
| 7,321,787 B2 | 1/2008 | Kim et al. |
| 7,339,926 B2 | 3/2008 | Stanwood et al. |
| 7,352,696 B2 | 4/2008 | Stephens et al. |
| 7,409,186 B2 | 8/2008 | Van Buren et al. |
| 7,430,397 B2 | 9/2008 | Suda et al. |
| 7,450,936 B2 | 11/2008 | Kim et al. |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 2001/0031646 A1 | 10/2001 | Williams et al. |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1 | 5/2002 | Sugar et al. |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson et al. |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0139175 A1 | 7/2003 | Kim et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0056802 A1 | 3/2004 | Hollister |
| 2004/0110469 A1* | 6/2004 | Judd et al. .................. 455/15 |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1* | 10/2004 | Nicholls et al. ............... 455/296 |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1 | 2/2005 | Stephens et al. |
| 2005/0042999 A1 | 2/2005 | Rappaport et al. |
| 2005/0130587 A1 | 6/2005 | Suda et al. |
| 2005/0190822 A1 | 9/2005 | Fujii et al. |
| 2005/0201315 A1 | 9/2005 | Lakkis et al. |
| 2005/0254442 A1 | 11/2005 | Proctor, Jr. et al. |
| 2005/0256963 A1 | 11/2005 | Proctor, Jr. et al. |
| 2005/0286448 A1 | 12/2005 | Proctor et al. |
| 2006/0019603 A1 | 1/2006 | Pergal |
| 2006/0028388 A1 | 2/2006 | Schantz |
| 2006/0035643 A1 | 2/2006 | Vook et al. |
| 2006/0041680 A1 | 2/2006 | Proctor, Jr. et al. |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | Proctor et al. |
| 2008/0057862 A1 | 3/2008 | Smith et al. |
| 2008/0233942 A9 | 9/2008 | Kim et al. |

FOREIGN PATENT DOCUMENTS

| | | |
|---|---|---|
| EP | 0523687 A2 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 A1 | 8/1998 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 2100358 A | 4/1990 |
| JP | 3021884 A | 1/1991 |
| JP | 05063623 | 3/1993 |
| JP | 05102907 | 4/1993 |
| JP | 6013947 A | 1/1994 |
| JP | 06334577 | 12/1994 |
| JP | 07030473 | 1/1995 |
| JP | 7079187 A | 3/1995 |
| JP | 07079205 | 3/1995 |
| JP | 07131401 | 5/1995 |
| JP | 8097762 A | 4/1996 |
| JP | 8274706 A | 10/1996 |
| JP | 09-018484 | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 11055713 | 2/1999 |
| JP | 11127104 | 5/1999 |
| JP | 11298421 | 10/1999 |
| JP | 2000031877 | 1/2000 |
| JP | 200502218 T | 2/2000 |
| JP | 2000082983 A | 3/2000 |
| JP | 2000236290 A | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2002033691 | 1/2002 |
| JP | 2002111571 A | 4/2002 |
| JP | 2002271255 A | 9/2002 |
| JP | 2003174394 A | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2005072646 | 3/2005 |
| JP | 2005110150 | 4/2005 |
| JP | 2005236626 | 9/2005 |
| JP | 2005531202 | 10/2005 |
| JP | 2005531265 | 10/2005 |
| JP | 2006503481 | 1/2006 |
| JP | 2006505146 | 2/2006 |
| KR | 100610929 | 8/2006 |
| RU | 2120702 C1 | 10/1998 |
| WO | WO9214339 | 8/1992 |
| WO | WO9715991 | 5/1997 |
| WO | WO9734434 | 9/1997 |
| WO | WO9858461 A1 | 12/1998 |

| | | |
|---|---|---|
| WO | WO9959264 A2 | 11/1999 |
| WO | WO0050971 A2 | 8/2000 |
| WO | WO0152447 | 7/2001 |
| WO | WO0182512 A1 | 11/2001 |
| WO | WO0199308 | 12/2001 |
| WO | WO0208857 A2 | 1/2002 |
| WO | WO0217572 A2 | 2/2002 |
| WO | WO03013005 A2 | 2/2003 |
| WO | WO2004001892 | 12/2003 |
| WO | WO2004001986 A2 | 12/2003 |
| WO | WO2004002014 | 12/2003 |
| WO | WO2004002014 A1 | 12/2003 |
| WO | WO2004004365 A2 | 1/2004 |
| WO | WO2004032362 | 4/2004 |
| WO | WO2004036789 | 4/2004 |
| WO | WO2004038958 | 5/2004 |
| WO | WO2004062305 A1 | 7/2004 |
| WO | WO05115022 | 12/2005 |

OTHER PUBLICATIONS

Written Opinion—PCT/US04/007708, International Search Authority—US, Oct. 18, 2004.
Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.
Code of Federal Regulations, Title 47 Telecommunication; "Federal Communications Commission code part 15.407," Federal Communications Commission vol. 1, chapter I, part 15.407.
First Office Action issued from the Chinese Patent Office in connection with corresponding Chinese application No. 200380101286.2.
Draft Corrigendum to IEEE Standard for Local and Metropolitan Area Networks- Part 16: Air Interface for Fixed Broadband Wireless Access Systems. IEEE P802.16-2004/Cor1/D5.
Draft IEEE Standard for Local and Metropolitan Area Networks- Part 16: Air Interface for Fixed and Mobile Broadband Wireless Access Systems; Amendment for Physical and Medium Access Control Layers for Combined Fixed and Mobile Operation in Licensed Bands.
First Report issued by IP Australia on Jul. 31, 2007 in connection with the corresponding Australian application No. 2003239577.
IEEE 802.16(e), Part 16: Air Interface for Fixed Broadband Wireless Access Systems, 2005, Sections 8.4.10.2.1; 8.4.10.3.2.
IEEE Std 802.11-1999 (Reaff 2003), "Part 11: Wireless LAN Medium Access Control (MAC) and Physical Layer (PHY) Specifications," LAN MAN Standards Committee of the IEEE Computer Society: Paragraphs 7.2.3.1 and 7.2.3.9; Paragraph 7.3.2.4; Paragraphs 15.4.6.2 and 18.4.6.2.
IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.
IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society. Published by The Institute of Electrical and Electronics Engineers, Inc., Jun. 27, 2003.
IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.
International Search Report—PCT/US04/007708, International Search Authority—US, Oct. 18, 2004.
Kutlu, et al., "Performance Analysis of MAC Protocols for Wireless Control Area Network," 1996 IEEE, pp. 494-499.
Mexican Office communication dated Jul. 2, 2007 issued from Mexican Patent Office for application PA/a/2004/011588 with partial translation thereof.
Notification of the First Office Action from Chinese Patent Office dates Sep. 8, 2006 for the corresponding Chinese patent application No. 200380105267.7.
Office Action issued from the Mexican Patent Office dated Feb. 22, 2008 in connection with the corresponding Mexican Patent Application No. PA/a/2004/011588.
Office communication dated Jan. 12, 2007 issued from the European Patent Office for counterpart application No. 03734139.9-1246.
Office communication dated Oct. 19, 2006 issued from the Mexican Patent Office for counterpart application No. PA/a/2004/011588.
Official communication issued from the European Patent Office dated Aug. 7, 2007 for the corresponding European patent application No. 03759271.4-2412.
Official communication issued from the European Patent Office dated Dec. 19, 2006 for the corresponding European patent application No. 03759271.4-2412.
Second Office Action issued from the Chinese Patent Office on Jul. 20, 2007 in connection with corresponding Chinese application No. 200380101286.2.
Specifications for 2.3 GHz Band Portable Internet Service—Physical & Medium Access Control Layer, TTAS.KO-06.0082/R1, Dec. 2005.
Third Office Action issued from the Patent Office of People's Republic of China dated Jan. 4, 2008 in corresponding Chinese Patent Application No. 200380101286.2.
Translation of Office Action issued by Chinese Patent Office on Oct. 19, 2007 in connection with the corresponding Chinese application No. 03814391.7.
U.S. PTO Office Action mailed on Apr. 17, 2007 for the corresponding parent U.S. Appl. No. 11/339,838, now U.S. Patent No. 7,230,935.
U.S. PTO Office Action mailed on Jan. 24, 2007 for the corresponding parent U.S. Appl. No. 11/339,838, now U.S. Patent No. 7,230,935.
U.S. PTO Office Action mailed on Nov. 21, 2006 for the corresponding parent U.S. Appl. No. 11/339,838, now U.S. Patent No. 7,230,935.
U.S. PTO Office Action mailed on Nov. 6, 2006 for the corresponding parent U.S. Appl. No. 11/339,838, now U.S. Patent No. 7,230,935.
Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands. IEEE P802.16E/D12, Oct. 2005.
Translation of Office Action in Japanese application 2004-544751, corresponding to U.S. Appl. No. 10/531,078, citing WO00050971, JP2002-111571, JP05-102907, JP63-160442, JP2000-502218, JP10-032557 and JP2000-082983. Dated Oct. 16, 2009 (080590JP).
Translation of Office Action in Japanese application 2004-565505, corresponding to U.S. Appl. No. 10/563,471, citing JP08-097762 and JP2001-111575. Dated Sep. 9, 2009 (080589JP).
Translation of Office Action in Japanese application 2004-553510, corresponding to U.S. Appl. No. 10/533,589, citing WO00050971 and JP09-182155. Dated Nov. 26, 2009 (080588JP).
Translation of Office Action in Japanese application 2004-565505, corresponding to U.S. Appl. No. 10/563,471, citing JP09-018484. Dated Mar. 26, 2010 (080589JP).
Translation of Office Action in Japanese application 2004-544751, corresponding to U.S. Appl. No. 10/516,327, citing WO00050971, JP2000-031877, JP2002-033691, JP2002-111571 and JP11-127104. Dated May 5, 2010 (080583JP).
Translation of Office Action in Japanese application 2004-544751, corresponding to U.S. Appl. No. 10/531,078, citing WO00050971, JP2002-111571, JP05-102907, JP63-160442, JP2000-502218, JP10-032557 and JP2000-082983. Dated Aug. 25, 2009 (080590JP).
Translation of Office Action in Japanese application 2004-553510, corresponding to U.S. Appl. No. 10/533,589, citing WO00050971, JP09-182155, JP64-011428 and JP62-040895, Dated Sep. 29, 2009 (080588JP).
Translation of Office Action in Japanese application 2004-565505, corresponding to U.S. Appl. No. 10/563,471, citing JP08-097762 and JP2001-111575. Dated Aug. 11, 2009 (080589JP).
Translation of Office Action in Japanese application 2004-565505, corresponding to U.S. Appl. No. 10/563,471, citing JP08-097762, JP2001-111575, JP09-018484 and JP11-055713. Dated Sep. 14, 2010 (080589JP).

Translation of Office Action in Japanese application 2004-565505, corresponding to U.S. application 10/563,471 citing JP09-018484. Dated Feb. 23, 2010 (080589JP).

Translation of Office Action in Japanese application 2009-503041, corresponding to U.S. Appl. No. 11/730,361, citing WO05115022, JP10-135892, JP2005-531265, 2006-503481, JP2005-531202 AND JP2006-505146. Dated Oct. 26, 2010 (080600JP).

Translation of Office Action in Korean application 2008-7026775, corresponding to U.S. Appl. No. 11/730,361, citing KR100610929 Dated Aug. 30, 2010 (080600KR).

Translation of Office Action in Korean application 2009-7010639, corresponding to U.S. Appl. No. 12/439,018, citing WO01052447 and US20040208258 Dated Nov. 15, 2010 (080608KR).

Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010 (080592JP).

Translation of Office Action in Japanese application 2009-526736 corresponding to U.S. Appl. No. 12/307,801, citing US20040110469, US20060019603, JP2005072646, JP2001016152, JP11298421, JP2001136115, JP2005110150, JP2005236626, W09715991 and WO0199308 dated Jan. 4, 2011 (080606JP).

\* cited by examiner

TRANSMISSION CANCELLER FOR WIRELESS LOCAL AREA NETWORK

CROSS REFERENCE TO RELATED APPLICATIONS

This application is related to and claims priority from U.S. Provisional Application No. 60/460,571 filed Apr. 7, 2003, and claims priority to PCT Application PCT/US04/007708, the contents of which are incorporated herein by reference.

BACKGROUND OF THE INVENTION

The present invention relates generally to wireless local area networks (WLANs) and, particularly, the present invention relates to canceling signal leakage in a frequency translating repeater.

Several standard protocols for wireless local area networks, commonly referred to as WLANs, are becoming popular, including 802.11 (as set forth in the 802.11 wireless standards), home RF, Bluetooth, and the like. The standard wireless protocol with the most commercial success to date is the 802.11b protocol although next generation protocols, such as 802.11g, are also gaining popularity.

While the specifications of products utilizing the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which for 802.11b are in the range of 2.4 GHz in an operating environment such as an indoor environment. Access point to client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

Repeaters are commonly used in the mobile wireless industry to increase the range of wireless systems. However, problems and complications arise in that system receivers and transmitters in any given device operate at the same frequency in a WLAN utilizing, for example, 802.11 WLAN or 802.16 WMAN wireless protocols. In such systems, when multiple transmitters operate simultaneously, as would be the case in repeater operation, difficulties arise. Typical WLAN protocols provide no defined receive and transmit periods and, thus, because random packets from each wireless network node are spontaneously generated and transmitted and are not temporally predictable, packet collisions may occur. Some remedies exist to address such difficulties, such as, for example, collision avoidance and random back-off protocols, which are used to avoid two or more nodes transmitting packets at the same time. Under 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a deplexing frequency offset. Frequency division duplexing (FDD) operation simplifies repeater operation since conflicts associated with repeater operation, such as those arising in situations where the receiver and transmitter channels are on the same frequency for both the uplink and the downlink, are not present.

Other cellular mobile systems separate receive and transmit channels by time rather than by frequency and further utilize scheduled times for specific uplink/downlink transmissions. Such operation is commonly referred to as time division duplexing (TDD). Repeaters for these systems are more easily built, as the transmission and reception times are well known and are broadcast by a base station. Receivers and transmitters for these systems may be isolated by any number of means including physical separation, antenna patterns, or polarization isolation. Even for these systems, the cost and complexity of a repeater may be greatly reduced by not offering the known timing information that is broadcast, thus allowing for more economically feasible repeaters. That being said, the techniques described herein may be combined with broadcast channel assignment information to aid the repeater in determining uplink and downlink timings, which may be required for centrally controlled TDD systems such as 802.20 or 802.16.

Thus, WLAN repeaters operating on the same frequencies have unique constraints due to the above spontaneous transmission capabilities and therefore require a unique solution. Since these repeaters use the same frequency for receive and transmit channels, some form of isolation must exist between the receive and transmit channels of the repeater. While some related systems such as, for example, CDMA systems used in wireless telephony, achieve channel isolation using sophisticated techniques such as directional antennas, physical separation of the receive and transmit antennas, or the like, such techniques are not practical for WLAN repeaters in many operating environments such as in the home where complicated hardware or lengthy cabling is not desirable or may be too costly.

One system, described in International Application No. PCT/US03/16208 and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second frequency channel used by a second device. The direction associated with the translation or conversion, such as from the frequency associated with the first channel to the frequency associated with the second channel, or from the second channel to the first channel, depends upon a real time configuration of the repeater and the WLAN environment. The WLAN repeater may be configured to monitor both channels for transmissions and, when a transmission is detected, translate the received signal at the first frequency to the other channel, where it is transmitted at the second frequency.

The above described approach solves both the isolation issue and the spontaneous transmission problems as described above by monitoring and translating in response to packet transmissions and may further be implemented in a small inexpensive unit. However, problems still arise in that a WLAN repeater in order to operate effectively must be capable of more fully isolating outbound transmissions on one of the frequency channels used within the frequency translating repeater from leaking energy into a receiver section tuned for the same frequency channel as that of the outbound transmission.

When CDMA or other FDD based wireless standards are implemented, isolation between the transmitter and receiver raises problems causing significant complication and expense, particularly in connection with handsets. A similar problem exists in connection with achieving isolation in the TDD frequency translating repeater as both the included repeater and FDD handsets receive and transmit simultaneously. The performance and cost of both systems are driven by the isolation between the receiver and transmitters operating at different frequencies. In both cases, the amount of broadband transmission noise and the main transmitter power causing non-linearity in the receivers front end are primary concerns, which are improved with the present invention.

SUMMARY OF THE INVENTION

Accordingly, in various exemplary and alternative exemplary embodiments, the present invention improves the performance of tranceivers which receive signals on one frequency while simultaneously transmitting significant signal power on another frequency. One preferred embodiment includes a repeater for extending the coverage area in a wireless environment such as a WLAN environment, and, broadly speaking, in any time division duplex system including IEEE 802.16, EEE 802.20 and TDS-CDMA, with a dynamic frequency detection method. An exemplary WLAN frequency translating repeater allows two WLAN nodes or units to communicate by translating packets from a first frequency channel used by one device to a second frequency channel used by a second device. The direction of the conversion from channel 1 to channel 2, versus from channel 2 to channel 1, is dependent upon real time configuration. The repeater may preferably monitor both channels for transmissions, and when a transmission on a channel is detected, the repeater is configured to translate the received signal to the other channel, where it is transmitted. It is important to note that the performance of an exemplary repeater is driven by the degree of isolation between the receiver input sections and the transmitter output sections since signal components from the transmitter output sections can jam the receiver. Isolation issues may also exist in FDD transceivers where the transmitter and receiver are simultaneously active While handsets for IS-2000 use Duplexers for filtering to reduce transmitter leakage into the receiver, duplexers are not effective for removing broadband RF noise from the transmitter located in the same frequency band as the receive signal. An analogous problem may be observed in TDD frequency translating repeaters.

Since solutions which involve limiting the maximum power to a level sufficiently low to prevent such jamming or solutions involving de-sensitizing the receiver also limit normal performance levels, the present invention is directed to canceling or otherwise nulling leakage signals coupled from the transmitter output sections into the receiver sections. An exemplary repeater in accordance with the present invention therefore includes active cancellation of leakage signals through specially adapted circuits, units, blocks, functions and the like as will be described in greater detail hereinafter. Although active cancellation in accordance with various exemplary embodiments is described in connection with use in a frequency translating repeater, broad applications will be apparent for radio transceivers in general. One exemplary application includes frequency division duplex (FDD) handsets or base stations utilizing CDMA technologies such as W-CDMA, IS-95, and IS-2000 or 1XEV-DV/DO, more broadly to other FDD based systems. Using the present invention, for example in connection with handsets and base stations, increased isolation performance results in an increase in receiver sensitivity, allowing increased transmitter power, and/or reduced implementation cost due to, for example, reduced filtering requirements.

In accordance with various exemplary embodiments, the presence of a signal on one of at least two channels must be detected with very little delay. Rapid signal detection can be difficult if processing is performed by an analog to digital converter (ADC) and a digital processor. Pipeline delays associated with the ADC and additional delays associated with the processor create obstacles to rapid detection.

RF in circuit propagation delays may be used to facilitate rapid detection by allowing analog storage of received waveforms while signal detection and transmitter configuration take place. Signal detection may be performed prior to the expiration of RF delay periods, thereby providing additional time to perform the required configuration for the system.

Detection of received waveforms is preferably accomplished using logarithmic amplifiers (log amps) as will be described in greater detail herein after. Outputs from log amps are fed to an ADC and then to a processor. As will be appreciated, the delay associated with such an architecture drives the cost and performance of an exemplary repeater. One benefit of using an ADC in connection with a processor is the ability to convert analog signals and the ability to add additional intelligence to the detection process, but at the cost of additional delay and expense. Thus, an alternative to such an architecture is an architecture whereby fast analog detectors work in connection with a supervisory processor which can override decisions made by fast analog detection portions.

RF delays are preferably implemented using Surface Acoustic Wave (SAW) filters. SAW filters provide the capability to enable analog signal storage, to provide channel selection, to provide jammer suppression, to provide a "feed-forward" variable gain control path, and the like. An exemplary detection process in accordance with various exemplary embodiments may be performed in an analog only configuration using a threshold comparator. It will be appreciated that such an analog only mode would not make use of an ADC directly. An exemplary processor may play a role in the detection process to, for example, actively control the analog reference voltage associated with detection comparators used to make the detection decisions. Alternatively, the output of the log amps may be digitized and the detection decision may be made in an all digital fashion. As noted above, a draw back of an all-digital architecture is that high speed ADCs and a high performance processor are required leading to relatively high expenses. An additional problem associated with the use of an all digital path and a processor is the significant delay associated with digital sampling and decision making.

In accordance with various exemplary embodiments, an analog comparator may be used having a processor-controlled threshold. The exemplary analog comparator may further be equipped with a digital override to allow a fast initial decision to be made based on analog detection, while providing a slower more accurate and controllable final decision to be made using the processor. For example, when a signal from an interferer is detected, and the processor recognizes that the packet duration is longer than the wireless protocol will allow, the AGC and/or the detector may be forced by the processor to turn off the output signal transmission. It will be appreciated that the AGC gain setting may be directly controlled and overridden providing usefulness in situations including detection of system feed-back oscillations, detection or occurrence of a false alarm, detection of interference, expiration of valid packet intervals and the like.

The use of analog detection and initial control allows for low latency detection and system configuration, while the use of a processor allows the additional robust control. Algorithms for achieving cancellation may also include control algorithms for characterization and assessment of interference from different devices including the device in which the processor is situated, establishment of initial system configuration, decoding of potential repeater control commands, the determination of system oscillations, and the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION OF THE INVENTION

Figure 1:
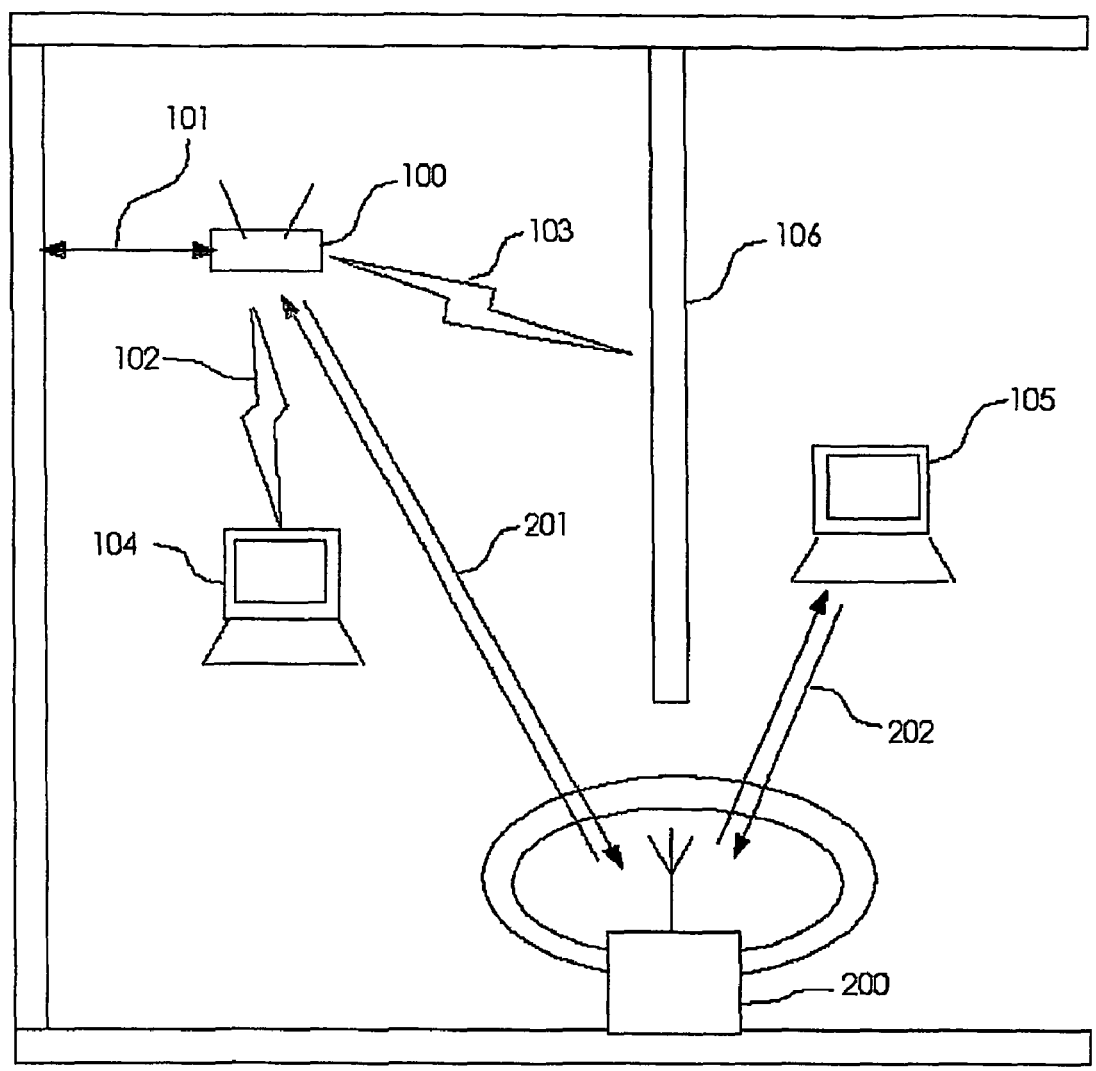
FIG. 1 is a diagram illustrating a WLAN including an exemplary repeater having gain control and cancellation in accordance with various exemplary embodiments.

This application is related to PCT Application PCT/US03/16208 entitled WIRELESS LOCAL AREA NETWORK REPEATER, the contents of which are incorporated herein by reference. Referring now to FIG. 1, a wide area connection 101, which could be, for example, an Ethernet connection, a Ti line, a wideband wireless connection or any other electrical connection providing a data communications path, may be connected to a wireless gateway, or access point (AP) 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for a wireless repeater 200, the structure and operation of which will now be described.

To enhance the coverage and/or communication data rate to the client unit 105, wireless repeater 200 receives packets transmitted on a first frequency channel 201 from the wireless gateway 100. The wireless repeater 200, which may be housed in an enclosure typically having dimensions of, for example, 2.5"×3.5"×0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, such as with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, and to retransmit the data packet to, for example AP 100, on first frequency channel 201.

Wireless repeater 200 is preferably capable of receiving two different frequencies simultaneously, such as first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Repeater 200 may thus receive and transmit packets at the same time on different frequency channels thereby extending the coverage and performance of the connection between AP 100 and client unit 105, and between peer-to-peer connections such as from one client unit to another client unit. When many units are isolated from one another, repeater unit 200 further acts as a wireless bridge allowing two different groups of units to communicate where optimum RF propagation and coverage or, in many cases, any RF propagation and coverage was not previously possible.

Figure 2:
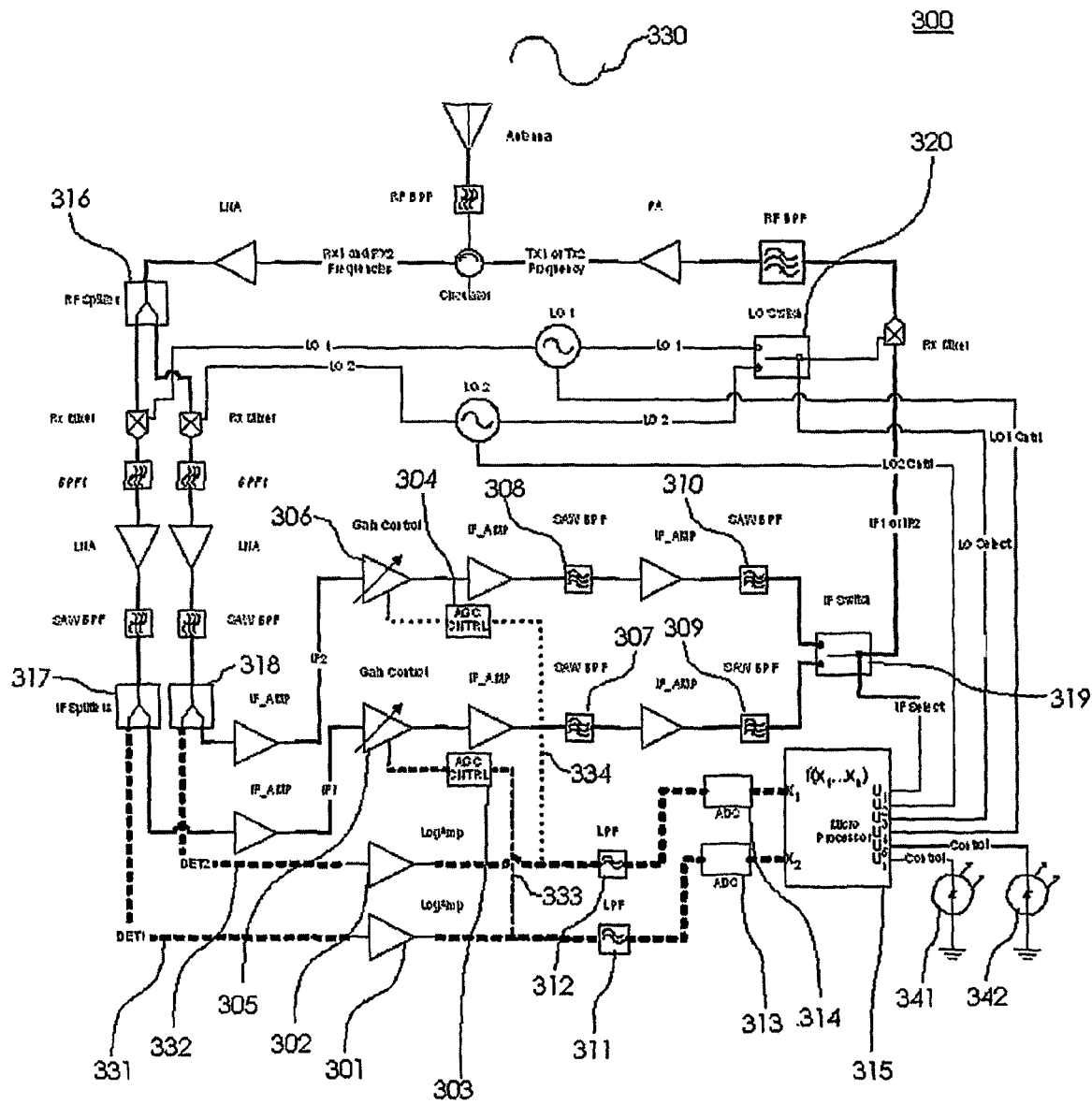
FIG. 2 is a schematic drawing illustrating an exemplary gain control circuit associated with an exemplary repeater of FIG. 1.

In accordance with various exemplary embodiments, repeater 200 is preferably configured to receive a signal and translate the frequency of the received signal with very little distortion or loss of the signal by, for example, properly controlling the gain of an exemplary transceiver section via Automatic Gain Control (AGC) circuitry as shown, for example, in FIG. 2. In accordance with various exemplary embodiments, wireless repeater 200 shown is capable of receiving two different frequency channels simultaneously, determining which one is active or otherwise has information present thereon, translating from one frequency channel to the other frequency channel and retransmitting the information which is a frequency translated version of the received signal on the new frequency channel.

In accordance with one preferred exemplary embodiment, AGC circuitry uses RF delay and filtering to allow analog storage of an exemplary received waveform while signal detection and transmitter configuration takes place. It should be noted that signal detection may occur both prior to and during transit of signals in filter elements 307-310 which are configured to add an amount of RF delay providing time to perform system configuration. It should be noted that a detector power level is preferably used to set a gain value on a parallel signal path as part of the gain control operation.

More specifically, the AGC circuitry includes logarithmic amplifiers 301 and 302, AGC control circuits 303 and 304, gain control elements 305 and 306, which may preferably include variable gain or variable attenuator elements, and filter elements 307-310 which may preferably include analog storage devices such as, for example, RF delay elements, delay lines and/or band pass filters. Low pass filter 311 and 312, and analog to digital converter (ADC) 313 and 314 are further preferably used to accomplish gain control under the direction and control of, for example, processor 315.

Since repeater 200 is configured to simultaneously detect and process two different frequency signals, received signal 330 is split and propagated on two different RF paths, for example, using RF splitter 316. Likewise, because the two different frequency paths must be delayed and controlled separately, each signal path is further split by, for example, IF splitters 317 and 318. One of the split signal outputs from IF splitter 317 is preferably coupled to logarithmic amplifiers 301 and the other split signal output is preferably coupled to gain control elements 305. Likewise, one of the split signal outputs from IF splitter 318 is preferably coupled to logarithmic amplifiers 302 and the other split signal output is preferably coupled to gain control elements 306. The output of logarithmic amplifiers 301 is fed to AGC control circuit 303 and low pass filter 311. Likewise, the output of logarithmic amplifiers 302 is fed to AGC control circuit 304 and low pass filter 312. It should be noted that while logarithmic amplifiers 301 and 302 preferably provide an output voltage proportional to the logarithm of the power of received signal 330, tracking the envelope thereof, other devices known to those of ordinary skill in the art may also be used to track the envelope or samples of the envelope directly or proportionately.

The basic operation of components along the detection path of received signal 330 such as, for example, low pass filters 311 and 312, analog-to-digital converters (ADC) 313 and 314, and processor 315 for example, would be readily apparent to those of ordinary skill in the art and thus a detailed review of the basic operation thereof is omitted, such operation is disclosed in detail in commonly assigned co-pending PCT Patent Application No. PCT/US03/16208. However it should be briefly noted that processor 315 preferably detects the presence of an IF signal on detection paths DET1 331 and DET2 332. As described in the above identified co-pending application, signal detection may be based on the signal level exceeding a threshold using, for example, analog or digital signal comparison implements in processor 315, or could be performed by other means well known to those of ordinary skill in the art. Once the signal is detected, gain control is applied to the signal using for example, AGC control circuits 303 and 304 on IF path IF1 333 or IF2 334 respectively, depending on the channel.

With reference still to FIG. 2 of the drawings, gain control is applied to signals on IF paths IF1 333 and IF2 334 using AGC control circuits 303 and 304 which circuits provide, inter alia, filtering of the analog voltage at the output of, for example, logarithmic amplifiers 301 and 302, any DC offset adjustment which may be necessary, AGC set point reference and control, level shifting/scaling, any required polarity reversal, and the like as would be appreciated by one of ordinary skill in the art. The output of AGC control circuits 303 and 304 are fed to gain control elements 305 and 306 which may provide either adjustable gain or adjustable attenuation of received signal 330 based on a value associated with, for example, the desired transmitter output power. It should be noted that AGC control circuits 303 and 304 may be one of a variety of gain control circuits, devices, or the like, as would be well known to those of ordinary skill in the art.

As an example of gain control in accordance with various exemplary embodiments, a variable attenuator could be used for gain control element 305 under the following conditions: desired output power +15 dBm, received signal power −80 dBm, total transceiver losses 65 dB, total transceiver gains 165 dB.

Under these conditions, a variable attenuator associated with, for example, gain control element 305, should be set according to the relation: Rx Signal Power−Desired Output Power+Total Gains−Total Losses, thus the attenuation would be −80 dBm−15 dBm+165 dB−65 dB resulting in 5 dB of attenuation. It will be appreciated that a voltage may be calculated and applied to the gain control element 305, for example, by AGC control circuit 303 resulting in the desired 5 dB attenuation setting. It should also be noted that while ACG control circuit 303 and gain control element 305 are described herein, the above description applies to the operation of AGC control circuit 304 and gain control element 306.

Thus, receive signal 330 in order to be retransmitted in accordance with various exemplary embodiments, and in accordance with the present example, is preferably output from gain control element 305 and delayed via filter elements 308 and 310 which are preferable Surface Acoustic Wave (SAW) filters. It will be appreciated that the delay introduced by filter elements 308 and 310 acts to essentially store the analog waveform while AGC and signal detection processes, for example as described above, are carried out, meaning that detection and gain control setting are preferably completed during the propagation interval of the signal.

In accordance with various exemplary and preferred exemplary embodiments, RF delays are imposed through SAW filter elements 307-310 enabling analog signal storage and channel selection, jammer suppression, and a feed-forward variable gain control path. AGC control circuits 303 and 304 and gain control elements 305 and 306 may be biased or otherwise set under control of for example processor 315, which is preferably a processor, such as a general purpose processor, dedicated processor, signal processing processor, or the like as would be understood by one of ordinary skill in the art. Further, set points may be obtained by processor 315 from a look up table or the like depending on which channel received signal 330 is received on and which channel is selected for signal retransmission. It should be noted that different bands have different transmit power limitations in different countries, thus the selection of gain set points may be driven by several factors resulting from the need to meet FCC requirements and related specifications for the desired band such as spectral re-growth and Effective Isotropic Radiated Power (EIRP).

After detection and setting of the gain control, IF switch 319 and LO switch 320 are preferably set to retransmit received signal 330 at a different frequency without significantly cutting off the waveform preamble. It is important to note that detection and power sensing, for example, as described above, is preferably performed on detector paths DET1 331 and DET2 332, but actual gain control may be applied the on IF paths IF1 333 and IF2 334. More specifically referring again to FIG. 2, outputs from the logarithmic amplifiers 301 and 302 are fed to AGC control circuits 303 and 304 which circuits are making adjustments either as variable gain or attenuation with regard to gain control elements 305 and 306.

One factor in determining a sequence of signal detection and gain control is the effect caused by splitting the output voltage from logarithmic amplifiers 301 and 302 into a signal detection path and a gain control path, each having potentially two different filter bandwidths. As can be noted from FIG. 2, the gain control path is the path to AGC control circuits 303 and 304, while the signal detection path is the path leading to low pass filters 311 and 312, as previously described. Thus, if desired, the AGC control values and the signal detection filter bandwidth could be set differently. For example, the AGC control loop could be set to react very quickly to the incoming power envelop while signal detection, as carried out, for example, in ADC 313 and 314 and processor 315, could be configured to react more slowly. As a result, received signal 330 propagating in gain control elements 305 and 306 can be tracked very accurately while the portion of received signal 330 propagating in ADC 313 and 314 and processor 315 may track more slowly, but with more detection process gain.

It should be noted that in accordance with various exemplary and preferred exemplary embodiments, two separate detectors are used for performing detection of the presence of received signal 330 and for detection of the power level thereof in order to set gain. Thus, since signal detection may occur more slowly than AGC as described, different signal detection and AGC filter bandwidths may be used beneficially, allowing variable control elements associated with AGC such as gain control elements 305 and 306 to have a faster or slower response than the output of filters 311 and 312.

Another factor in controlling gain is the relative distance between the receive and transmit channels. In accordance with the present invention, frequency separation between the receive channel and transmit channel may be reduced while maintaining or increasing the transmitter output power. Specifically, depending on the distance there between, the target output power or set point from the gain control elements 305 and 306 can be different to the extent that additional performance may be gained when the receive and transmit channels are further apart in, for example, the frequency domain. Gain values may be increased in gain control elements 305 and 306 while continuing to meet performance requirements. Further, AGC control circuits 303 and 304 may be programmed to increase power based on the frequency difference or, alternatively, processor 315 may be programmed to control AGC control circuits 303 and 304 based on frequency separation. Adjusting set points based on frequency separation may further include applying more filtering to any leakage signals picked up by a receiver to avoid self interference or by canceling leakage signals as will be described in greater detail hereinafter.

A factor affecting the choice of which channels to operate on during initial repeater power up may be influenced by choosing repeating channels based on the ability to transmit more power in different FCC bands or bands controlled by other regulatory bodies. For example, in the U-NII bands for operation in the United States, the maximum allowable transmit power for CH36-48 is 50 mW, for CH52-64 is 250 mW, and for CH149-161 is 1 W. Therefore it is possible to receive a signal in on a channel associated with one of the lower power bands and choose a channel on a different band allowing higher transmit power, thereby allowing a higher AGC set point. Thus the set points for a translation, say from F1 to F2 and F2 to F1 would be different. The decision of which channels to select is preferably pre-programmed during manufacturing, or, alternatively could be programmed in the field, in, for example, AGC control circuits 303 and 304 or processor 315.

In accordance with other aspects of the present invention, gain control may require AGC calibration during initial manufacturing. Calibration may be desirable to allow the use of lower tolerance parts thus reducing cost. Calibration may further provide for accuracy required for regional or band specific power settings. Accordingly, calibration may include setting up circuits and devices in accordance with one or more of the following; regional regulatory rules, frequency channel, received power level, transmit power level, temperature, and the like. In accordance with various exemplary and preferred exemplary embodiments, repeater 200 using, for example, processor 315, may store calibration tables and the like and be configured, for example through the use of software, programs, instructions or the like, to pass specific calibration values to AGC control circuits 305 and 306. Processor 315 would preferably utilize a digital to analog conversion process to control the set point.

As mentioned above, different detector outputs may be used for AGC and signal detection. Signal detection may be performed in an analog only configuration using, for example, a threshold comparator under the control of processor 315 which may be configured to actively control, for example, an analog reference voltage a threshold comparator uses to make the detection decision. Alternatively, received signal 330 may be digitized and a detection decision made, for example, in processor 315. One concern related to using a digital path and processor 315 includes delay associated with, for example, digital sampling and decision-making instructions in a processor 315.

In accordance with various alternative exemplary embodiments an analog comparator (not shown) having a threshold controlled by processor 315 may be used. Such a configuration could be equipped with a digital override to allow for a fast initial decision, converging to a slower more accurate and controllable decision using software, programs, instructions, and the like readable and executable by processor 315. For example, if an interferer is detected, and processor 315 recognizes that the packet duration is longer than the wireless protocol will allow, AGC control circuits 303 and 304 and/or detector could be turned off by processor 315 to prevent signal transmission. Thus the normal AGC setting may be directly controlled and overridden. Such control is further useful in situations including when a system feed-back oscillation is detected.

Figure 3:
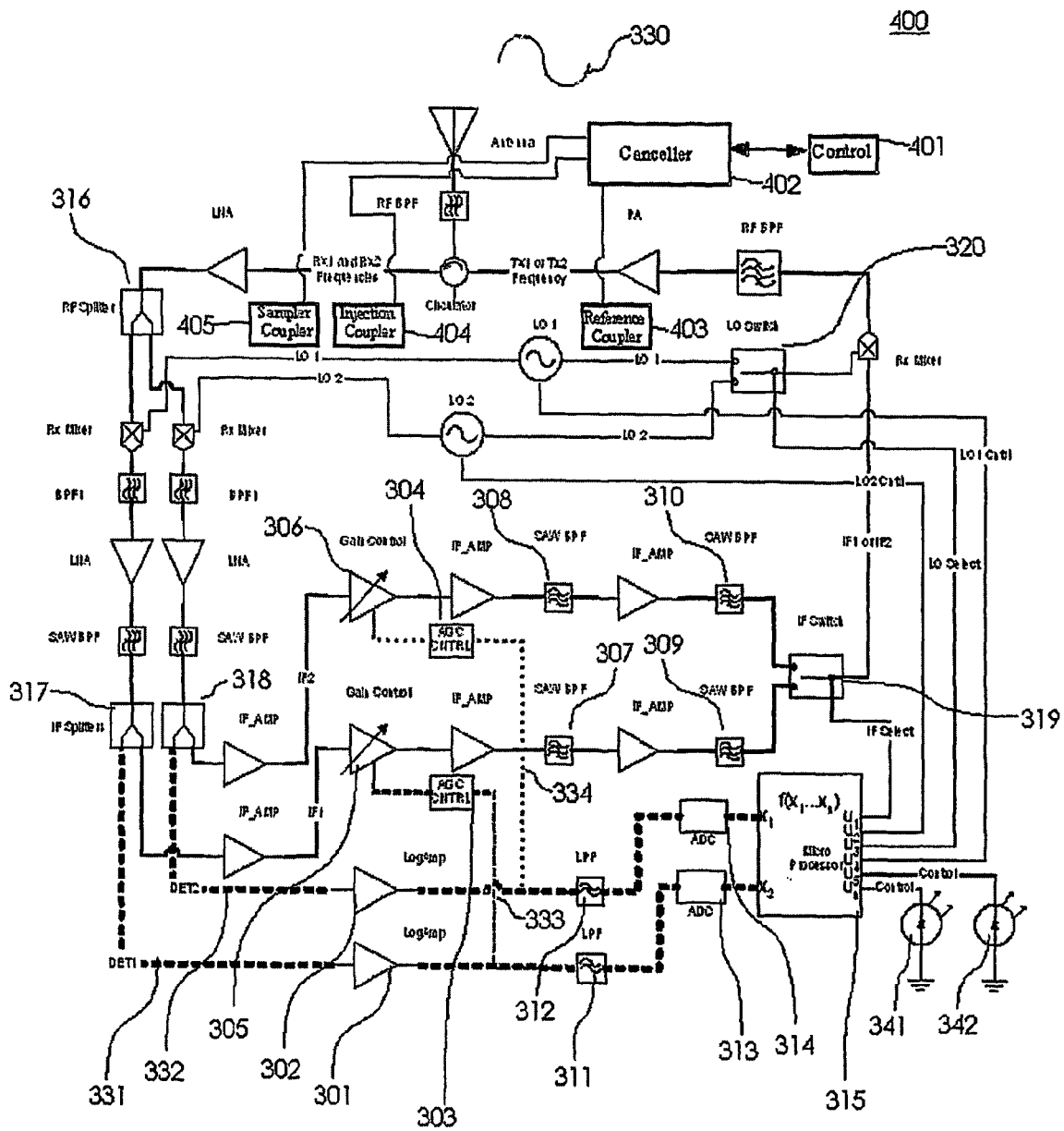
FIG. 3 is a schematic drawing illustrating an exemplary cancellation portion of an exemplary gain control circuit associated with an exemplary repeater of FIG. 1 and FIG. 2.

As previously described, self interference may further be reduced through the use of active cancellation in exemplary scenario 400 as illustrated in FIG. 3 where exemplary canceller related circuits are shown. A canceller circuit 402 may be controlled with control 401 which may be, for example, a processor, or alternatively control 401 may be coupled to a processor, or like control circuit. Reference coupler 403 provides a reference signal to canceller circuit 402 and may include a reference related to the signal being transmitted. A phase and amplitude adjusted reference signal may be generated using canceller 402 and then be injected into the canceller circuit at injection coupler 404. It should be noted that the injected reference signal does not contain any signal which may be present on the receive channel, and therefore will be combined with any leakage signal associated with a signal being transmitted. The leakage signal is typically 15 dB lower than the transmit signal, for example as measured at the output of an exemplary power amplifier (PA). Sampler coupler 405 provides a sample of the combined signal to canceller 402 which uses the sampled signal to minimize the leakage signal, prior to amplification, for example, in an exemplary low noise amplifier (LNA). It will be appreciated that leakage minimization can be performed by injecting components of a cancellation signal into injection coupler 404 or the like. By performing cancellation, receiver design requirements may be significantly relaxed since leakage components which represent one of the more potentially disrupting sources of interference, will be removed from the incoming signal.

Figure 4:
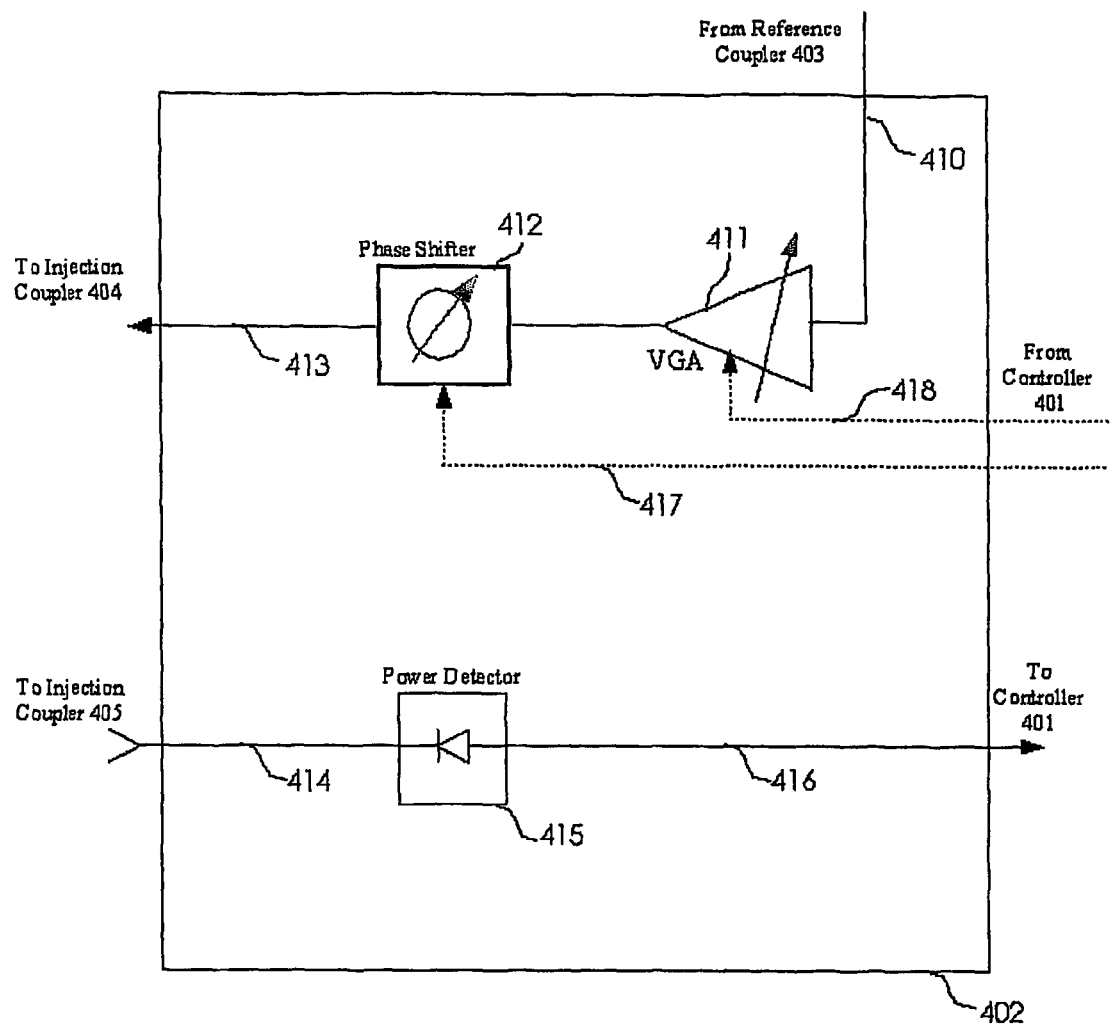
FIG. 4 is a schematic drawing illustrating an exemplary cancellation circuit of an exemplary repeater.

To provide a better understanding the construction and operation of canceller 402, reference is now made to the diagram of FIG. 4. The above described reference signal from reference coupler 403 is passed to input 410 of variable gain amplifier (VGA) 411 which may provide an amplitude adjustment either through a variable attenuator or a variable gain amplifier. The output of VGA 411 which is, for example, an amplified signal is coupled to a phase adjustment device such as phase shifter 412. It will be appreciated that both VGA 411 and phase shifter 412 are preferably controlled by, for example of control lines 418 and 417 respectively from the control 401 to achieve a phase shift suitable for applying to the reference signal to achieve cancellation in accordance with the invention. The phase shifted reference signal is passed on output line 413 to, for example, injection coupler 404. Injecting the phase shifted signal in the above described manner combines the reference signal derived from the signal destined for transmission with the leakage signal representing received energy components of the transmitted signal in the receiver.

Since gain and phase adjustments may not be optimal and may change over time and depending on frequency of operation, sample signal 414 may be provided from, for example, sample coupler 405 to facilitate adjusting amplification and phase shift of the reference signal input at 410 through control lines 418 and 417 respectively. Sample signal 414 may be passed to a power detector 415 which may be a detection diode or the like. Once sample signal 414 is detected in power detector 415, and detected sample signal 416 is generated, detected sample signal 416 is passed to control 401. It will be appreciated by one of ordinary skill in the art that control 401 preferably institutes the operation of a feedback loop, error signal minimizing algorithm or the like with the goal of minimizing the power of detected sample signal 416. Since the power levels associated with the transmitted signal will always be larger than the residual leakage signal in the receiver signal, even after cancellation, effective feedback can be obtained.

A value of a metric associated with detected sample signal 416 may be determined such as a power level, a received signal strength indicator (RSSI), a correlated power value, or the like. It will be appreciated that operation or execution of an exemplary minimizing algorithm such as a statistical gradient algorithm, steepest decent algorithm, perturbation algorithm, or other gradient following algorithm, will preferably result in an adjustment to signals on lines 417 and 418 to minimize the power on detected sample signal 416. In accordance with various alternative exemplary embodiments, for example in connection with FDD handsets, power detector (415) may be eliminated, and noise estimates or signal to noise ratio estimates inherently available as, for example, a metric during handset receiver operation may be used. Metrics may also be used to optimize leakage signal cancellation using one or more of a number of optimization algorithms known to those skilled in the art.

Figure 5:
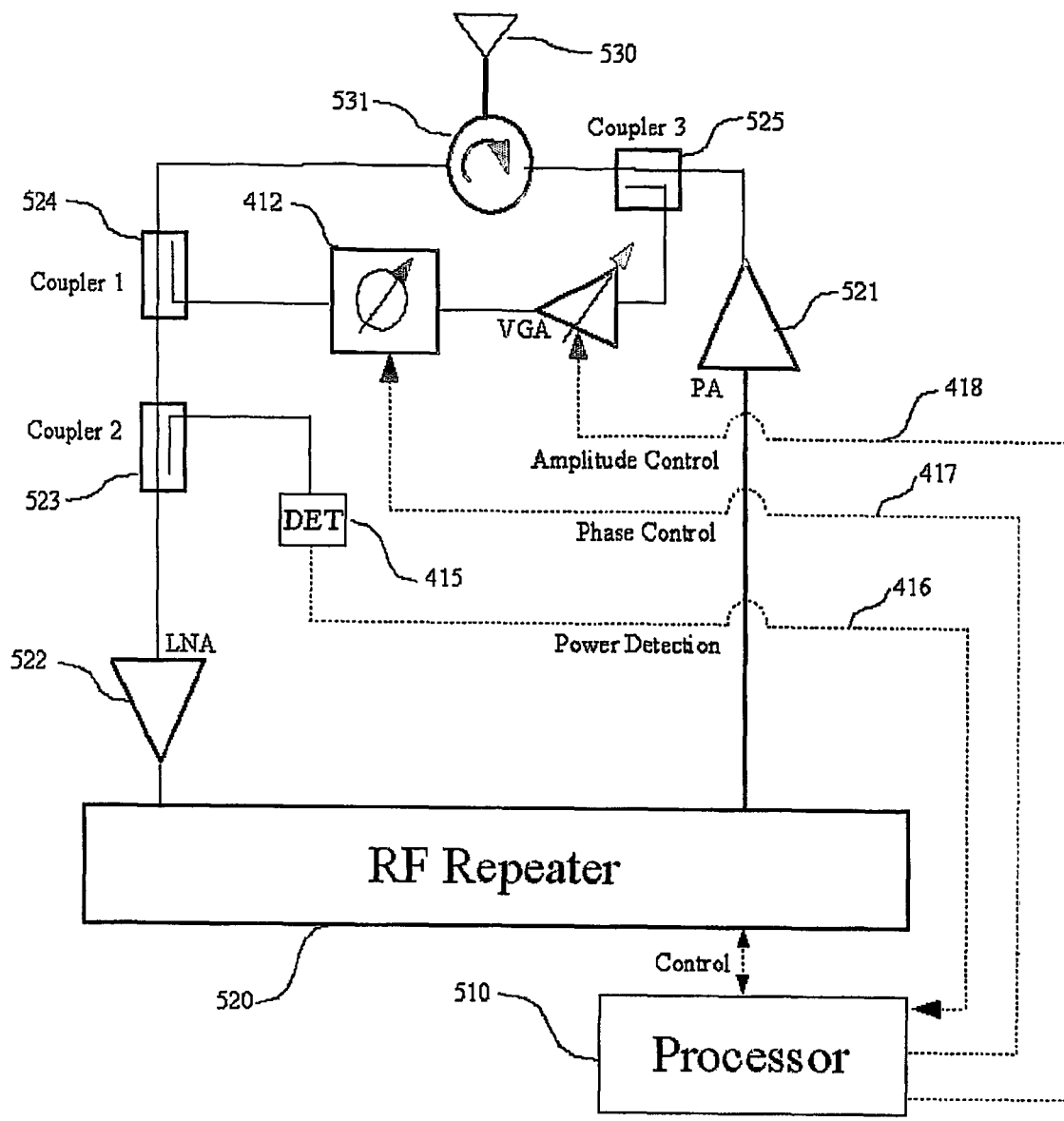
FIG. 5 is a schematic drawing illustrating an exemplary cancellation circuit of an exemplary repeater using a processor.

A more detailed view of an exemplary repeater with cancellation is shown in FIG. 5. A block diagram of the exemplary RF repeater shows a simplified diagram of a combination of the repeater of FIG. 4 and the canceller 402 of FIG. 5. Alternatively, exemplary embodiments may include an IS-2000 handset or equivalent where an exemplary repeater is replaced, for example, with a modem associated with the handset as would be appreciated by one of ordinary skill in the art. Thus in accordance with various alternative exemplary embodiments, exemplary RF repeater of block 520 may be replaced with an exemplary RF and base band processing block of a CDMA or other FDD handset. Processor 510 in operation with repeater 520 can act to control and receive input from exemplary components of the canceling repeater such as phase converter 412, VGA 411, and detector 415. Components in the RF signal path, such as PA 521 and LNA 522, may also be connected to repeater 520 and are shown in an external relation for illustrative purposes to highlight signal path connections between coupler 1 524, coupler 2 523, and coupler 3 525. Processor 510 may also be coupled to repeater 520 through control connection 511 and to exemplary components of the canceling repeater such as detector 415, phase converter 412, and VGA 411 through connections to detected sample signal 416, and control lines 417 and 418. Thus feedback associated with power detection can be obtained by processor 510 from power detector 415 through detected sample signal 416 and adjustments can be made through connections to phase and amplitude control, such as through VGA 411 and phase shifter 412, by way of control lines 418 and 417 respectively.

Figure 6:
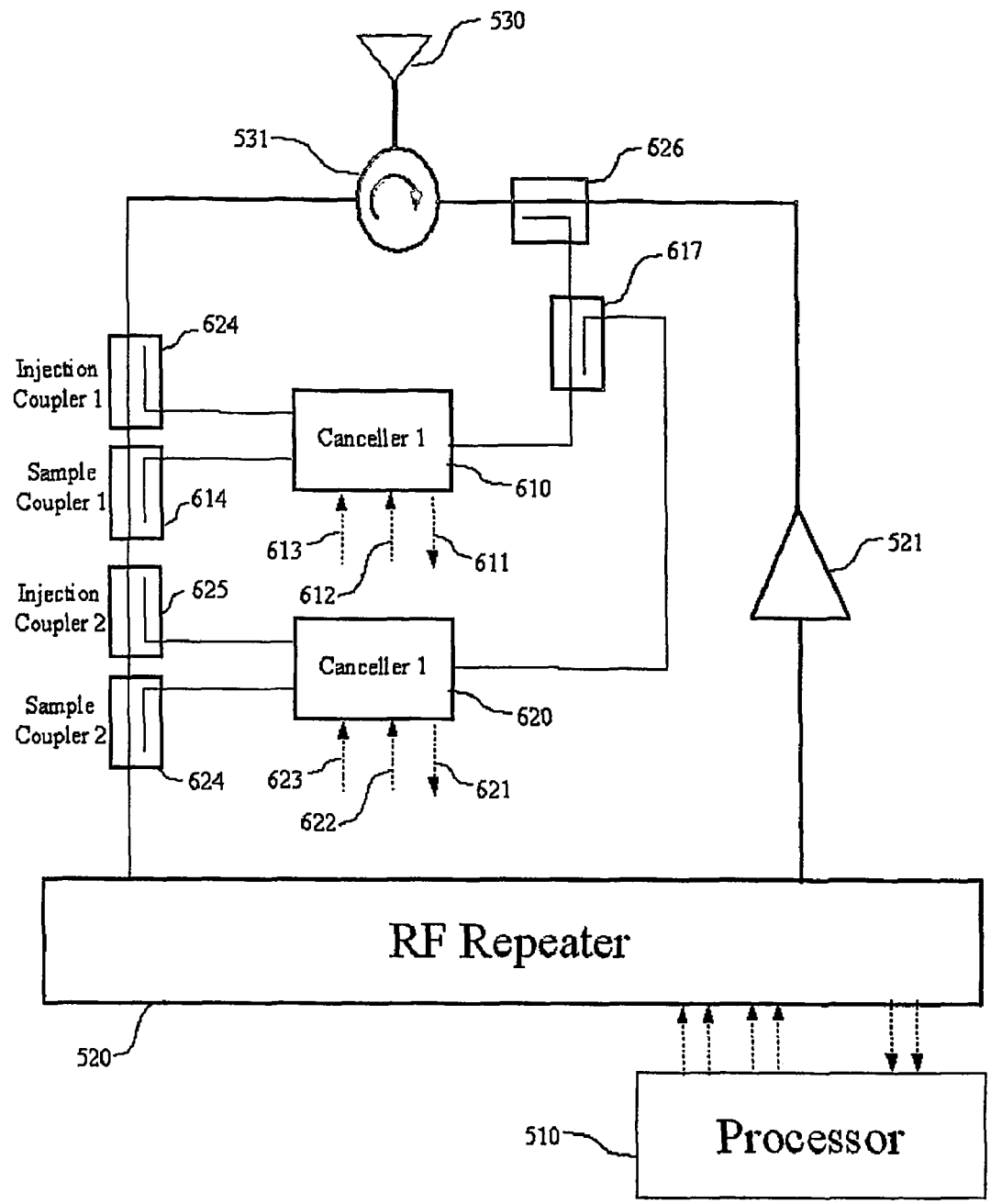
FIG. 6 is a schematic drawing illustrating two exemplary cancellation circuits of an exemplary repeater using a processor.

More significant cancellation of the leakage signal, that is, the components of the transmitted signal which leak into the receiver as described above, can be achieved using two cancellers in series as illustrated in FIG. 6. Alternatively, exemplary embodiments may be used with a IS-2000 handset or equivalent where an exemplary repeater is replaced, for example, with a modem associated with the handset as would be appreciated by one of ordinary skill in the art.

Canceller 1 610 and canceller 2 620 are both coupled, for example, through couplers 626 and 617 to the transmit side of repeater 520 after PA 521 in order to obtain a sample of the transmit signal. Canceller 1 610 and canceller 2 620 are controlled through connections to processor 510, for example through control connections 612, 613 and 622, 623 respectively, and may also provide input to processor 510 through lines 611 and 621 respectively. Processor 510 may operate on input data from lines 611 and 612, for example using the gradient following algorithms as described above, and provide cancellation control related outputs on control connections 612, 613 and 622, 623. Canceller 1 610 and canceller 2 620 are also connected to the receiver side of repeater 520, for example, before VGA 522 as shown in FIG. 5, to inject correction signals as described above, through injection coupler 1 624, injection coupler 2 625. Signal samples may be provided by canceller 1 610 and canceller 2 620, for example to facilitate feedback analysis, using sample coupler 1 614 and sample coupler 2 624. In accordance with various alternative exemplary embodiments, the RF repeater of block 520 may be replaced with exemplary RF and base band processing blocks associated with a CDMA or other FDD handset.

Figure 7:
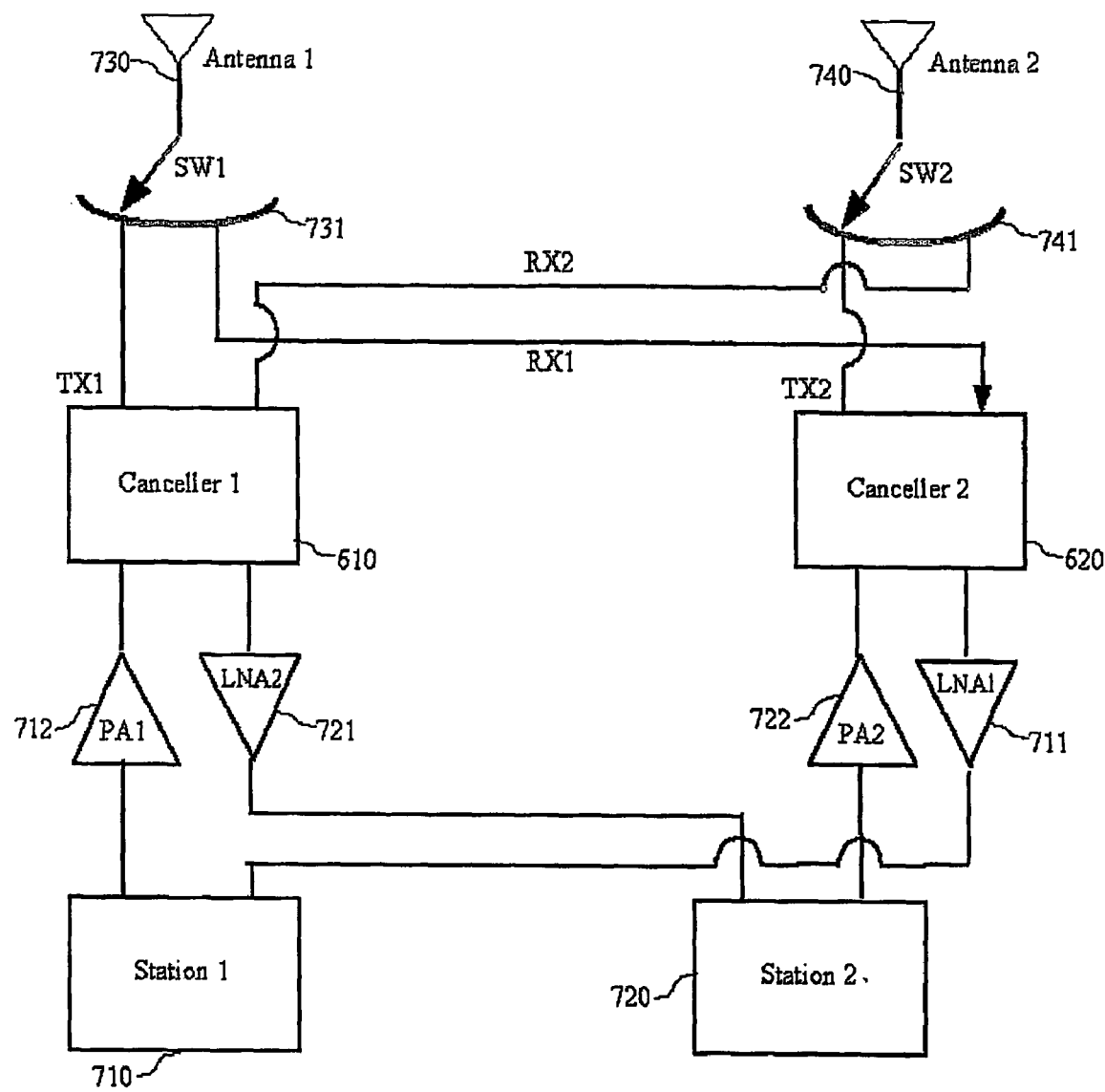
FIG. 7 is a schematic drawing illustrating an exemplary dual station cancellation configuration.

In accordance with still other exemplary embodiments, a dual station card repeater can be constructed as illustrated in FIG. 7. Station 1 710 and station 2 720 can be used in connection with the operation of two access points (APs) on adjacent or nearly adjacent channels with little or no modification to off-the shelf chips or chip sets used within the industry at large or specifically within the manufacture and construction of a typical AP. In the exemplary scenario illustrated, two cancellers such as canceller 1 610 and canceller 2 620 are used. Canceller 1 610 is used, for example, in connection with transmitter signal line TX1 from station 1 710 and receiver signal line RX2 terminating at station 2 720. Canceller 2 620 is used, for example, in connection with transmitter signal line TX2 from station 2 720 and receiver signal line RX1 terminating at station 1 710. It should be noted that receiver and transmitter signals associated with station 1 710 can be grouped and directed using transmit/receive (T/R) switch SW1 731 and receiver and transmitter signals associated with station 2 720 are grouped and otherwise directed in T/R switch SW2 741. It will be appreciated that T/R switches are typical of standard station operation with inputs and outputs associated with the switches being coupled to corresponding antennas such as antenna 1 730 and antenna 2 740.

In accordance with various alternative exemplary embodiments, switches SW1 731 and SW2 741 may share antennas, or may use cross polarization antennas to achieve a degree of isolation from each other. It should be noted that the receiver signal RX1 from antenna 1 730 may be switched to canceller 2 620 and output to LNA1 711 whereupon it may be output or otherwise coupled to station 1 710. The transmitter signal TX1 destined for output on antenna 1 730 and associated with station 1 710, may be amplified using, for example, PA1 712 the output of which is coupled to canceller 1 610. Similarly, the receiver signal RX2 from antenna 2 740 may be switched to canceller 1 610 and output to LNA2 721 whereupon it may be output or otherwise coupled to station 2 720. The transmitter signal TX2 destined for output on antenna 2 740 and associated with station 2 720, may be amplified using, for example, PA2 722 the output of which is coupled to canceller 2 620. It should further be noted that station 1 710 and station 2 720 can be standard 802.11 devices while canceller 1 610 and canceller 2 620 are device in accordance with the present invention. Gain and phase control adjustment as described above may preferably be performed in an exemplary canceller when a transmitter signal is being provided to the exemplary canceller.

One of ordinary skill in the art will recognize that as noted above, various techniques can be used to provide cancellation and the like in accordance with the present invention. Additionally, it will be appreciated that various components, such as control 401, couplers 403, 404, and 405, the functionality of processor 315 and other elements such as switches 731 and 741 could be combined into a single integrated device. Other changes and alterations to specific components, and the interconnections thereof, can be made by one of ordinary skill in the art without deviating from the scope and spirit of the present invention.

What is claimed is:

1. A method for canceling a leakage signal coupled from a transmitter to a receive signal path associated with a receiver, the transmitter and the receiver contained in a single wireless device operating using at least two frequency channels, the receiver operating on a first one of the at least two frequency channels and the transmitter operating on a second one of the at least two frequency channels, the method comprising:

sampling a signal for transmission on the second of the at least two frequency channels;
adjusting one or more parameters associated with the sampled signal to form an adjusted signal; and
combining the adjusted signal with the receive signal path including the leakage signal, to form a combined signal so as to cancel the leakage signal.

2. The method according to claim 1, wherein the single wireless device includes a frequency translating repeater.

3. The method according to claim 2, further comprising operating the frequency translating repeater in one of a wireless area network (WLAN) and a wireless metropolitan area network (WMAN).

4. The method according to claim 1, wherein the single wireless device includes a wireless terminal for use in one or more of voice and data communications.

5. The method according to claim 4, further comprising operating the wireless terminal according to one or more of an IS-95 protocol, a IS-2000 protocol, a W-CDMA, and a derivative protocol.

6. The method according to claim 1, further comprising:
sampling the combined signal to determine a metric associated with the leakage signal; and
re-adjusting the one or more parameters associated with the sampled signal to form a re-adjusted signal based on the determined metric.

7. The method according to claim 6, wherein the metric includes one or more of a power level, a received signal strength indicator (RSSI), a correlated power value, and a noise estimate associated with the receiver.

8. The method according to claim 6, wherein the re-adjusting the one or more parameters includes minimizing the metric associated with the leakage signal.

9. The method according to claim 8, wherein the minimizing includes minimizing according to one or more of a perturbation algorithm, a steepest decent algorithm, gradient algorithm, and statistical gradient algorithm.

10. The method according to claim 1, wherein the sampling includes sampling the signal for transmission after amplification of the signal.

11. The method according to claim 1, wherein the sampling includes sampling the signal for transmission prior to transmission of the signal over an antenna.

12. The method according to claim 1, wherein the sampling includes sampling the signal for transmission prior to passing the signal through a circulator.

13. The method according to claim 1, wherein the combining includes combining the adjusted signal using an antenna.

14. The method according to claim 1, wherein the combining includes combining the adjusted signal using a circulator.

15. The method according to claim 1, wherein the one or more parameters includes one or more of a phase shift parameter and a amplitude parameter.

16. An apparatus configured to cancel a leakage signal coupled from a transmitter to a receive signal path associated with a receiver, the transmitter and the receiver contained in a single wireless device operating using at least two frequency channels, the receiver operating on a first one of the at least two frequency channels and the transmitter operating on a second one of the at least two frequency channels, the apparatus comprising:
a radio frequency interface;
a processor; and
a memory coupled to the processor and the radio frequency interface, the memory containing instructions for causing the processor to:

sample a signal for transmission on the second of the at least two frequency channels;

adjust one or more parameters associated with the sampled signal to form an adjusted signal; and combine the adjusted signal with the receive signal path including the leakage signal, to form a combined signal so as to cancel the leakage signal.

17. The apparatus according to claim 16, wherein the single wireless device includes a frequency translating repeater.

18. The apparatus according to claim 17, wherein the frequency translating repeater is configured to operate in one of a wireless area network (WLAN) and a wireless metropolitan area network (WMAN).

19. The apparatus according to claim 16, wherein the single wireless device includes a wireless terminal for use in one or more of voice and data communications.

20. The apparatus according to claim 19, wherein the wireless terminal is configured according to one or more of an IS-95 protocol, a IS-2000 protocol, a W-CDMA, and a derivative protocol.

21. The apparatus according to claim 20, wherein the instructions further cause the processor to: sample the combined signal to determine a metric associated with the leakage signal; and re-adjust the one or more parameters associated with the sampled signal to form a re-adjusted signal based on the determined metric.

22. The apparatus according to claim 21, wherein the metric includes one or more of a power level, a received signal strength indicator (RSSI), a correlated power value, and a noise estimate associated with the receiver.

23. The apparatus according to claim 21, wherein the instructions in causing the processor to re-adjust the one or more parameters further cause the processor to minimize the metric associated with the leakage signal.

24. The apparatus according to claim 23, wherein the minimizing includes minimizing according to one or more of a perturbation algorithm, a steepest decent algorithm, gradient algorithm, and statistical gradient algorithm.

25. The apparatus according to claim 16, wherein the instructions in causing the processor to sample further cause the processor sample the signal for transmission after amplification of the signal.

26. The apparatus according to claim 16, wherein the instructions in causing the processor to sample further cause the processor sample the signal for transmission prior to transmission of the signal over an antenna.

27. The apparatus according to claim 16, wherein the instructions in causing the processor to sample further cause the processor sample the signal for transmission prior to passing the signal through a circulator.

28. The apparatus according to claim 16, wherein the instructions in causing the processor to combine further cause the processor combine the adjusted signal using an antenna.

29. The apparatus according to claim 16, wherein the instructions in causing the processor to combine further cause the processor combine the adjusted signal using a circulator.

30. The apparatus according to claim 16, wherein the one or more parameters includes one or more of a phase shift parameter and a amplitude parameter.

31. The apparatus according to claim 16, wherein instructions cause the processor to continuously minimize the determined metric only when the transmitter is actively transmitting the signal.

32. A canceller configured to cancel a leakage signal coupled from a transmitter to a receive signal path associated with a receiver, the transmitter and the receiver contained in a single wireless device operating using at least two frequency channels, the receiver operating on a first one of the at least two frequency channels and the transmitter operating on a second one of the at least two frequency channels, the canceller comprising:

a first coupler coupled to the transmit signal path, the first coupler configured to generate a reference signal;

a second coupler coupled to the receive signal path, the second coupler configured to couple an adjusted signal to the receive signal path;

a third coupler coupled to the receive signal path, the third coupler configured to generate a sampled signal;

a parameter adjuster configured to adjust at least a first and a second parameter associated with the adjusted signal; and a detector configured to detect a level associated with the leakage signal.

33. The canceller according to claim 32, wherein the single wireless device includes a frequency translating repeater.

34. The canceller according to claim 33, wherein the frequency translating repeater is configured to operate in one of a wireless area network (WLAN) and a wireless metropolitan area network (WMA.

35. The canceller according to claim 32, wherein the single wireless device includes a wireless terminal for use in one or more of voice and data communications.

36. The canceller according to claim 35, wherein the wireless terminal is configured according to one or more of an IS-95 protocol, a IS-2000 protocol, a W-CDMA, and a derivative protocol.

37. The canceller according to claim 36, further comprising a controller configured to minimize the detected level by controlling the parameter adjuster so as to adjust the first and second parameters according to an adjustment procedure.

38. The canceller according to claim 37, wherein the first parameter includes an amplitude parameter and the second parameter includes a phase shift parameter.

39. The canceller according to claim 37, wherein the controller is further configured to minimize the detected level only during a calibration procedure.

40. The canceller according to claim 37, wherein the controller is further configured to continuously minimize the detected level.

41. The canceller according to claim 37, wherein the controller is further configured to continuously minimize the detected level only when the transmitter is actively transmitting signal.

42. An apparatus configured to cancel a leakage signal coupled from a transmitter to a receive signal path associated with a receiver, the transmitter and the receiver contained in a single wireless device operating using at least two frequency channels, the receiver operating on a first one of the at least two frequency channels and the transmitter operating on a second one of the at least two frequency channels, the apparatus comprising:

means for sampling a signal for transmission on the second of the at least two frequency channels;

means for adjusting one or more parameters associated with the sampled signal to form an adjusted signal; and means for combining the adjusted signal with the receive signal path including the leakage signal, to form a combined signal so as to cancel the leakage signal.

* * * * *